US012592572B2

(12) United States Patent
George et al.

(10) Patent No.: US 12,592,572 B2
(45) Date of Patent: Mar. 31, 2026

(54) BATTERY SYSTEM COMPRISING FIRST AND SECOND ELECTRICAL ENERGY STORES AND A VOLTAGE CONVERSATION UNIT HAVING MULTIPLE VOLTAGE CONVERSION FUNCTIONALITIES THAT SHARE CIRCUITRY

(71) Applicant: McLaren Automotive Limited, Woking (GB)

(72) Inventors: Sunoj George, Surrey (GB); Johannes Bernards, Surrey (GB); Gregory Tzermias, Surrey (GB); Leon Brown, Surrey (GB)

(73) Assignee: McLaren Automotive Limited, Working (GB)

( * ) Notice: Subject to any disclaimer, the term of this patent is extended or adjusted under 35 U.S.C. 154(b) by 985 days.

(21) Appl. No.: 17/679,304

(22) Filed: Feb. 24, 2022

(65) Prior Publication Data

US 2022/0271539 A1     Aug. 25, 2022

(30) Foreign Application Priority Data

Feb. 24, 2021     (GB) .................................... 2102624

(51) Int. Cl.
| | |
|---|---|
| *H02J 7/00* | (2006.01) |
| *B60L 58/22* | (2019.01) |

(52) U.S. Cl.
CPC ............ *H02J 7/0014* (2013.01); *B60L 58/22* (2019.02); *B60L 2240/547* (2013.01)

(58) Field of Classification Search
CPC .......... B60L 53/20; B60L 58/20; B60L 58/22; B60L 2210/10; B60L 2210/12;
(Continued)

(56) References Cited

U.S. PATENT DOCUMENTS

| | | | | |
|---|---|---|---|---|
| 6,484,830 B1 * | 11/2002 | Gruenwald | .............. | B60K 6/54 |
| | | | | 903/917 |
| 6,651,759 B1 * | 11/2003 | Gruenwald | .............. | B60K 6/54 |
| | | | | 903/917 |

(Continued)

FOREIGN PATENT DOCUMENTS

| | | |
|---|---|---|
| CN | 105244978 | 1/2016 |
| DE | 102009014386 | 9/2010 |

(Continued)

OTHER PUBLICATIONS

"GB Application No. 2102624.0 Search Report, mailed Dec. 9, 2021", 3 pages.

(Continued)

*Primary Examiner* — Drew A Dunn
*Assistant Examiner* — Frank Alexis Silva
(74) *Attorney, Agent, or Firm* — Kilpatrick Townsend & Stockton LLP

(57)     ABSTRACT

A battery system including: a first electrical energy store being configured to provide a first electrical energy output at a first voltage and being connected to a voltage conversion unit; a second electrical energy store being configured to provide a second electrical energy output at a second voltage and being connected to an output of the battery system; and the voltage conversion unit connecting the first electrical energy store and the second electrical energy store and being configured to: perform a first voltage conversion functionality, in which the voltage conversion unit is configured to convert between the first voltage and the second voltage; and perform a second voltage conversion functionality, in which the voltage conversion unit is configured to convert between a third voltage and the first or second voltage; the first voltage conversion functionality and the second voltage (Continued)

conversion functionality sharing circuitry of the voltage conversion unit.

19 Claims, 2 Drawing Sheets

(58) Field of Classification Search
CPC ............ B60L 2240/547; B60L 2260/26; H02J 7/00032; H02J 7/0014; H02J 7/342; H02J 7/1423; H02J 2310/48
USPC ........................................................ 320/109
See application file for complete search history.

(56) References Cited

U.S. PATENT DOCUMENTS

| | | | | |
|---|---|---|---|---|
| 7,004,273 | B1 * | 2/2006 | Gruenwald ........... | B60W 20/13 |
| | | | | 180/65.245 |
| 7,252,165 | B1 * | 8/2007 | Gruenwald ............ | B60L 50/61 |
| | | | | 180/65.265 |
| 7,681,676 | B2 * | 3/2010 | Kydd ...................... | B60K 6/48 |
| | | | | 180/65.21 |
| 7,733,039 | B2 * | 6/2010 | Su ........................... | B60L 53/24 |
| | | | | 180/65.6 |
| 7,960,857 | B2 * | 6/2011 | King ....................... | B60L 1/006 |
| | | | | 307/10.1 |
| 8,058,830 | B2 * | 11/2011 | John ...................... | B60L 58/20 |
| | | | | 318/722 |
| 8,138,720 | B2 * | 3/2012 | Snyder ................... | B60L 58/20 |
| | | | | 307/53 |
| 8,378,623 | B2 * | 2/2013 | Kusch .................... | B60L 58/20 |
| | | | | 320/104 |
| 8,664,803 | B2 * | 3/2014 | Urano .................... | H02J 50/12 |
| | | | | 307/104 |
| 8,860,363 | B2 | 10/2014 | Ang | |
| 8,916,993 | B2 * | 12/2014 | Berry ..................... | B60L 50/66 |
| | | | | 307/77 |
| 8,970,176 | B2 * | 3/2015 | Ballatine ................ | H02J 1/102 |
| | | | | 307/18 |
| 9,013,168 | B2 * | 4/2015 | King ....................... | H02J 1/102 |
| | | | | 323/299 |
| 9,079,501 | B2 * | 7/2015 | Komiya ................. | B60L 8/003 |
| 9,397,580 | B1 * | 7/2016 | Alexander .......... | H02M 3/1582 |
| 9,399,404 | B2 * | 7/2016 | Ose ......................... | B60L 53/00 |
| 9,431,888 | B1 * | 8/2016 | Alexander ............ | H02M 5/225 |
| 9,527,402 | B2 | 12/2016 | Wyatt et al. | |
| 9,647,568 | B1 * | 5/2017 | Bundschuh ......... | H02M 7/4807 |
| 9,718,372 | B2 * | 8/2017 | Teraya ................... | B60L 1/006 |
| 9,796,258 | B1 * | 10/2017 | Bundschuh .......... | H02M 5/225 |
| 9,809,128 | B2 * | 11/2017 | Berry ..................... | B60L 50/40 |
| 9,878,635 | B1 * | 1/2018 | Khaligh ................. | B60L 58/20 |
| 9,935,471 | B2 * | 4/2018 | Takizawa .............. | H02J 7/0013 |
| 10,065,509 | B2 * | 9/2018 | Shin ........................ | B60L 50/15 |
| 10,250,044 | B2 * | 4/2019 | Schindler ............... | B60L 58/19 |
| 10,263,456 | B1 * | 4/2019 | Wang ......................... | H02J 9/06 |
| 10,439,544 | B2 * | 10/2019 | Unno ..................... | H02P 29/024 |
| 10,442,309 | B2 * | 10/2019 | Goetz ................. | H02M 3/1582 |
| 10,569,656 | B2 * | 2/2020 | Ono .................... | B60L 15/2009 |
| 10,770,914 | B2 * | 9/2020 | Delevski ............. | H02J 7/00714 |
| 10,819,136 | B2 * | 10/2020 | Judge ................... | B60L 50/16 |
| 10,836,259 | B2 * | 11/2020 | Awad Alla ............... | B60L 3/04 |
| 10,913,444 | B2 * | 2/2021 | Zhou ....................... | B60L 50/13 |
| 10,974,609 | B2 * | 4/2021 | Gruber ................... | B60L 53/14 |
| 11,052,843 | B2 * | 7/2021 | Doersam ............... | B60L 50/66 |
| 11,097,626 | B2 * | 8/2021 | Pfeilschifter ........... | B60L 53/20 |
| 11,108,261 | B2 * | 8/2021 | Youn ...................... | B60L 53/20 |
| 11,121,650 | B2 * | 9/2021 | Froelich .................. | B60K 1/02 |
| 11,230,183 | B2 * | 1/2022 | Furukawa ............. | B60L 50/40 |
| 11,316,434 | B2 * | 4/2022 | Suzuki ............. | H02M 3/33573 |
| 11,318,851 | B2 * | 5/2022 | Ruppert ................. | B60L 58/20 |
| 11,374,430 | B2 * | 6/2022 | Blank ................... | E02F 9/2095 |
| 11,444,469 | B2 * | 9/2022 | Nakayama ............. | B60L 58/22 |
| 11,643,065 | B2 * | 5/2023 | Furukawa ............. | B60W 20/10 |
| | | | | 180/65.265 |

| | | | | |
|---|---|---|---|---|
| 11,804,795 | B2 * | 10/2023 | Kong ..................... | G01D 5/204 |
| 11,811,248 | B2 * | 11/2023 | Delevski ............... | H02J 7/0071 |
| 11,981,217 | B2 * | 5/2024 | Friegel ................... | B60L 53/00 |
| 12,057,716 | B1 * | 8/2024 | Lujan ..................... | B60L 50/52 |
| 12,124,242 | B2 * | 10/2024 | Kong ..................... | G01D 5/20 |
| 12,344,122 | B2 * | 7/2025 | Song ...................... | H02J 7/342 |
| 2004/0201365 | A1 * | 10/2004 | Dasgupta ............... | B60L 58/20 |
| | | | | 320/116 |
| 2007/0068714 | A1 * | 3/2007 | Bender ................... | B60K 6/28 |
| | | | | 180/65.29 |
| 2008/0111508 | A1 | 5/2008 | Bhola et al. | |
| 2008/0190680 | A1 * | 8/2008 | Kaneko ................... | B60L 58/20 |
| | | | | 180/170 |
| 2009/0212626 | A1 * | 8/2009 | Snyder ................... | B60L 15/209 |
| | | | | 903/930 |
| 2009/0218983 | A1 * | 9/2009 | Loudot .................... | H02J 7/35 |
| | | | | 320/101 |
| 2010/0084211 | A1 | 4/2010 | Seidel et al. | |
| 2010/0133900 | A1 | 6/2010 | King et al. | |
| 2010/0198421 | A1 * | 8/2010 | Fahimi .................... | H02J 3/381 |
| | | | | 700/291 |
| 2010/0253148 | A1 * | 10/2010 | Matsui ..................... | H02J 1/08 |
| | | | | 307/75 |
| 2011/0188271 | A1 | 8/2011 | Shinotsuka et al. | |
| 2012/0038216 | A1 | 2/2012 | Berry et al. | |
| 2012/0112693 | A1 * | 5/2012 | Kusch .................... | B60L 58/20 |
| | | | | 320/109 |
| 2012/0161534 | A1 * | 6/2012 | Urano .................... | H02J 50/90 |
| | | | | 307/104 |
| 2012/0256568 | A1 * | 10/2012 | Lee .......................... | B60L 7/26 |
| | | | | 429/150 |
| 2012/0267952 | A1 * | 10/2012 | Ballatine ................. | H02J 7/34 |
| | | | | 307/26 |
| 2013/0049684 | A1 * | 2/2013 | Kusch .................... | B60L 58/20 |
| | | | | 320/109 |
| 2013/0054069 | A1 * | 2/2013 | Komiya ................. | B60L 58/18 |
| | | | | 701/22 |
| 2013/0106195 | A1 * | 5/2013 | Kusch .................... | B60L 53/22 |
| | | | | 307/82 |
| 2013/0221745 | A1 * | 8/2013 | Vershinin ................ | B60L 58/13 |
| | | | | 307/10.1 |
| 2013/0300196 | A1 * | 11/2013 | Clark ........................ | H02J 1/10 |
| | | | | 307/26 |
| 2013/0328539 | A1 * | 12/2013 | King ....................... | B60L 58/20 |
| | | | | 323/299 |
| 2014/0050999 | A1 | 2/2014 | Tolmachev | |
| 2014/0285010 | A1 * | 9/2014 | Cameron ................. | H02J 7/35 |
| | | | | 307/29 |
| 2015/0008850 | A1 * | 1/2015 | Zhao ...................... | B60L 53/14 |
| | | | | 318/139 |
| 2015/0008866 | A1 * | 1/2015 | Wang ..................... | B60L 58/12 |
| | | | | 320/104 |
| 2015/0015207 | A1 * | 1/2015 | Wang ..................... | B60L 53/60 |
| | | | | 320/135 |
| 2015/0061569 | A1 * | 3/2015 | Alexander .............. | B60L 53/63 |
| | | | | 320/109 |
| 2015/0084345 | A1 | 3/2015 | Klinkig et al. | |
| 2015/0108925 | A1 * | 4/2015 | Kanakasabai .......... | H02P 27/06 |
| | | | | 29/825 |
| 2015/0115708 | A1 * | 4/2015 | Berry ..................... | B60L 50/64 |
| | | | | 307/10.1 |
| 2015/0130277 | A1 * | 5/2015 | Ballantine ............... | H02J 3/381 |
| | | | | 307/26 |
| 2015/0134172 | A1 * | 5/2015 | Ose ................... | H01M 10/0481 |
| | | | | 701/22 |
| 2015/0137736 | A1 * | 5/2015 | Lucea ................... | H02J 7/0018 |
| | | | | 320/103 |
| 2015/0222146 | A1 * | 8/2015 | Alexander ................ | H02J 7/35 |
| | | | | 307/76 |
| 2015/0283913 | A1 | 10/2015 | Chemin et al. | |
| 2015/0303538 | A1 | 10/2015 | Chen et al. | |
| 2015/0307041 | A1 * | 10/2015 | Hirano ............... | H02J 7/00712 |
| | | | | 307/10.1 |
| 2015/0343909 | A1 | 12/2015 | Hikiri et al. | |
| 2015/0349638 | A1 * | 12/2015 | Sylla ..................... | H02M 3/158 |
| | | | | 307/10.1 |

(56) References Cited

U.S. PATENT DOCUMENTS

| | | | |
|---|---|---|---|
| 2016/0121733 A1* | 5/2016 | Shin | B60L 50/15 |
| | | | 307/10.1 |
| 2016/0297309 A1* | 10/2016 | Kim | H02M 7/44 |
| 2016/0336928 A1* | 11/2016 | Kuznetsov | H02J 3/30 |
| 2017/0036545 A1* | 2/2017 | Lopez De Arroyabe | |
| | | | H01M 10/46 |
| 2017/0054401 A1* | 2/2017 | Takizawa | H02J 7/0013 |
| 2017/0101022 A1* | 4/2017 | Morgan | B60L 53/66 |
| 2017/0104436 A1* | 4/2017 | Unno | B60L 50/51 |
| 2017/0197520 A1* | 7/2017 | Schindler | B60L 58/16 |
| 2017/0203850 A1 | 7/2017 | Wang et al. | |
| 2017/0259687 A1 | 9/2017 | Chikkannanavar et al. | |
| 2018/0026457 A1* | 1/2018 | Delevski | H02J 7/0024 |
| | | | 320/106 |
| 2018/0043789 A1 | 2/2018 | Goetz | |
| 2018/0159430 A1* | 6/2018 | Albert | H02M 3/1582 |
| 2018/0159515 A1* | 6/2018 | Kuznetsov | H02J 9/066 |
| 2018/0301989 A1* | 10/2018 | Yamagami | H02M 7/4835 |
| 2018/0339781 A1 | 11/2018 | Vander Lind et al. | |
| 2019/0168628 A1* | 6/2019 | Pfeilschifter | B60L 53/18 |
| 2019/0210475 A1* | 7/2019 | Pfeilschifter | B60L 53/66 |
| 2019/0222053 A1* | 7/2019 | Gruber | H02J 7/342 |
| 2019/0255967 A1* | 8/2019 | Doersam | H02J 7/0024 |
| 2019/0288526 A1 | 9/2019 | Jaensch et al. | |
| 2019/0299807 A1 | 10/2019 | Oyama et al. | |
| 2020/0016979 A1 | 1/2020 | Awad Alla et al. | |
| 2020/0076311 A1* | 3/2020 | Bortis | H02M 3/285 |
| 2020/0094813 A1* | 3/2020 | Zhou | B60L 15/2009 |
| 2020/0112260 A1* | 4/2020 | Suzuki | H02J 7/00 |
| 2020/0130511 A1 | 4/2020 | Botts et al. | |
| 2020/0144851 A1* | 5/2020 | Delevski | H02J 7/1423 |
| 2020/0185943 A1* | 6/2020 | Youn | B60L 58/13 |
| 2020/0220355 A1* | 7/2020 | Xie | H02J 3/381 |
| 2020/0266653 A1* | 8/2020 | Judge | B60L 50/16 |
| 2020/0369156 A1* | 11/2020 | Moon | B60L 7/18 |
| 2021/0016672 A1* | 1/2021 | Zhu | H02J 7/00714 |
| 2021/0061132 A1* | 3/2021 | Stefanziosa | H02J 7/00 |
| 2021/0086629 A1* | 3/2021 | Ruppert | B60L 58/20 |
| 2021/0135577 A1* | 5/2021 | Li | H02M 3/1584 |
| 2021/0155100 A1* | 5/2021 | Khaligh | B60L 55/00 |
| 2021/0175741 A1* | 6/2021 | Blank | B66C 13/22 |
| 2021/0234378 A1* | 7/2021 | Nakayama | B60L 58/22 |
| 2021/0323411 A1* | 10/2021 | Friegel | H02J 7/1446 |
| 2021/0328453 A1* | 10/2021 | Vidal Clos | H02J 1/14 |
| 2021/0394606 A1* | 12/2021 | Furukawa | B60K 1/04 |
| 2021/0394609 A1* | 12/2021 | Furukawa | B60K 6/445 |
| 2022/0037700 A1* | 2/2022 | Ackermann | H01M 10/613 |
| 2022/0045628 A1* | 2/2022 | Chen | H02J 7/0016 |
| 2022/0045640 A1* | 2/2022 | Kong | H02P 23/18 |
| 2022/0069700 A1* | 3/2022 | Dai | H02M 7/797 |

| | | | |
|---|---|---|---|
| 2022/0072971 A1* | 3/2022 | Allison | B60L 55/00 |
| 2022/0111758 A1 | 4/2022 | Ijaz et al. | |
| 2022/0111759 A1 | 4/2022 | Ijaz | |
| 2022/0115884 A1* | 4/2022 | Wang | H02M 3/01 |
| 2022/0115897 A1 | 4/2022 | Ijaz | |
| 2022/0149745 A1* | 5/2022 | Ibrahim | H02M 7/003 |
| 2022/0153149 A1* | 5/2022 | Kusch | B60L 58/20 |
| 2022/0410725 A1* | 12/2022 | Hauck | H02J 7/345 |
| 2022/0416549 A1* | 12/2022 | Mi | H02J 7/0019 |
| 2023/0020549 A1* | 1/2023 | Vitanescu | H02J 7/00308 |
| 2023/0022784 A1* | 1/2023 | Suzuki | H02M 3/285 |
| 2023/0023934 A1* | 1/2023 | Vahid | H02M 3/158 |
| 2023/0085935 A1* | 3/2023 | Kong | H02P 21/18 |
| | | | 318/605 |
| 2023/0095057 A1* | 3/2023 | Xu | H02J 3/32 |
| | | | 323/221 |
| 2023/0136629 A1* | 5/2023 | Kumar | H02M 3/33592 |
| | | | 363/17 |
| 2023/0202343 A1* | 6/2023 | Song | H02J 7/0047 |
| | | | 307/10.1 |
| 2023/0211686 A1* | 7/2023 | Smolenaers | B60L 53/53 |
| | | | 320/109 |
| 2023/0223861 A1* | 7/2023 | Everts | H02J 7/02 |
| | | | 363/125 |
| 2023/0264894 A1* | 8/2023 | Hauck | B60L 58/20 |
| | | | 307/10.1 |
| 2023/0361688 A1* | 11/2023 | Wang | H01M 10/425 |
| 2023/0406126 A1* | 12/2023 | Mauger | B60L 53/60 |
| 2024/0308364 A1* | 9/2024 | Mader | B60L 53/20 |

FOREIGN PATENT DOCUMENTS

| | | |
|---|---|---|
| DE | 102010006125 | 8/2011 |
| DE | 102013225097 | 6/2015 |
| DE | 102016218842 | 3/2018 |
| EP | 4049884 A1 | 8/2022 |
| EP | 4211011 A1 | 7/2023 |
| WO | 2022076146 A1 | 4/2022 |

OTHER PUBLICATIONS

European Application No. 22158590.4, Office Action mailed on Oct. 9, 2023, 7 pages.
United Kingdom Application No. 2102624.0, Examination Report mailed on Nov. 2, 2023, 4 pages.
EP Application No. EP 22158590.4 , "European Search Report, mailed Mar. 15, 2023", 6 pages.
"Communication pursuant to Article 94(3) EPC", issued by the European Patent Office for application No. 22158590.4 on Apr. 26, 2024, 7 pages.

* cited by examiner

BATTERY SYSTEM COMPRISING FIRST AND SECOND ELECTRICAL ENERGY STORES AND A VOLTAGE CONVERSATION UNIT HAVING MULTIPLE VOLTAGE CONVERSION FUNCTIONALITIES THAT SHARE CIRCUITRY

CROSS-REFERENCE TO RELATED APPLICATIONS

This application claims priority to Great Britain patent application number GB 2102624.0, titled "Battery System," filed Feb. 24, 2021, the entirety of which is hereby incorporated by reference.

BACKGROUND

This invention relates to battery systems for electric or hybrid vehicles. In particular, this application relates to a battery system having an output for supplying electrical energy to an electric drive motor of a vehicle.

Electric and hybrid vehicles are well known and are becoming increasingly prevalent as the desire to reduce carbon emissions increases. FIG. 1 shows the layout of an electric vehicle 1. The vehicle shown is an all-wheel drive vehicle. The vehicle comprises four wheels 2, 4, 6 and 8. Wheels 2 and 6 are positioned on half-shafts 10a and 10b of axle 10 respectively. Wheels 2 and 6 can be driven by electric drive motors 12 and 14 respectively. That is, axle 10 may be referred to as a driven axle. Wheels 4 and 8 are positioned on axle half-shafts 11a and 11b of axle 11 respectively. Wheels 4 and 8 can both be driven by electric drive motor 16. That is, axle 11 may be referred to as a driven axle. A differential 18 is positioned between electric drive motor 16 and wheels 4 and 8. The purpose of differential is to allow wheels 4 and 8 to rotate at different speeds (e.g. when the vehicle is turning).

An electric drive motor converts electrical energy into mechanical energy. Typically, electric motors operate through the interaction between a magnetic field and an electric current in a wire winding to generate force in the form of rotation of a shaft. Referring to FIG. 1, said rotation may be used to drive axle half-shafts 10a, 10b, and/or 11a and 11b and hence wheels 2, 6, and/or 4 and 8.

Battery system 20 supplies electrical energy to electric drive motors 12, 14, 16. The characteristics of the battery system 20 (e.g. specific energy, specific power, discharge rate, size and weight) are vital in determining the performance of the vehicle (e.g. acceleration, top speed and range). Typical battery systems for electric vehicles comprise a plurality of lithium ion cells for supplying electrical energy. In order to charge its cells, battery system 20 may receive electric energy from an external electrical energy source 26.

It would be desirable if there was an improved battery system for electric and hybrid vehicles.

SUMMARY

According to a first aspect of the present invention there is provided a battery system having an output for supplying electrical energy to an electric drive motor of a vehicle, the battery system comprising: a first electrical energy store having a first nominal voltage and being configured to provide a first electrical energy output at a first voltage, the first electrical energy store being connected to a voltage conversion unit; a second electrical energy store having a second nominal voltage, the second nominal voltage being greater than the first nominal voltage, and being configured to provide a second electrical energy output at a second voltage, the second electrical energy store being connected to the output of the battery system; and the voltage conversion unit connecting the first electrical energy store and the second electrical energy store and being configured to convert between the first voltage and the second voltage, and the voltage conversion unit being connected to the output of the battery system such that the first electrical energy store is connected to the output of the battery system via the voltage conversion unit.

The first voltage may be in a first range between a first undervoltage and a first overvoltage, the first nominal voltage being within the first range, and the second voltage may be in a second range between a second undervoltage and a second overvoltage, the second nominal voltage being within the second range.

The voltage conversion unit may be a direct current to direct current voltage conversion unit.

The first electrical energy store may be operable to supply electrical energy to the second electrical energy store via the voltage conversion unit so as to charge the second electrical energy store.

The second electrical energy store may be operable to supply electrical energy to the first electrical energy store via the voltage conversion unit so as to charge the first electrical energy store.

The voltage conversion unit may be further configured to receive electrical energy from an external electrical energy source, and supply that electrical energy to the first electrical energy store and/or the second electrical energy store so as to charge that respective electrical energy store.

The voltage conversion unit may be configured to: receive an electrical energy input from the external electrical energy source at a third voltage; convert the electrical energy input at the third voltage to an electrical energy output at the first voltage; and provide the electrical energy output at the first voltage to the first electrical energy store so as to charge the first electrical energy store.

The voltage conversion unit may be configured to: receive, from the external electrical energy source, an electrical energy input at a third voltage; convert the electrical energy input at the third voltage to an electrical energy output at the second voltage; and provide the electrical energy output at the second voltage to the second electrical energy store so as to charge the second electrical energy store.

The electrical energy conversion unit may be further configured to convert from the first and/or second voltage to a fourth voltage.

The voltage conversion unit may be configured to: receive, from the first electrical energy store, the first electrical energy output at the first voltage; convert the first electrical energy output at the first voltage to an electrical energy output at the fourth voltage; and provide the electrical energy output at the fourth voltage to another output of the battery system.

The voltage conversion unit may be configured to: receive, from the second electrical energy store, the second electrical energy output at the second voltage; convert the second electrical energy output at the second voltage to an electrical energy output at the fourth voltage; and provide the electrical energy output at the fourth voltage to another output of the battery system.

The fourth voltage may be 12 volts or 48 volts.

The first electrical energy store and the second electrical energy store may have different specific energies, different specific powers, and/or different electrical energy discharge rates.

The first electrical energy store may have a higher specific energy, a lower electrical energy discharge rate, and/or a lower specific power than the second electrical energy store.

The first electrical energy store may comprise at least one solid state electrical energy cell.

The first electrical energy store may have a lower specific energy, a higher electrical energy discharge rate, and/or a higher specific power than the second electrical energy store.

The second electrical energy store may comprise at least one solid state electrical energy cell.

The battery system may further comprise a power inverter connecting the voltage conversion unit and/or the second electrical energy store to the output, the power inverter being configured to convert electrical energy in the form of direct current output by the voltage conversion unit and/or the second electrical energy store to electrical energy in the form of alternating current for outputting from the output.

There is also provided a vehicle comprising at least one wheel configured to be driven by an electric drive motor connected to the output of a battery system as described herein.

BRIEF DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
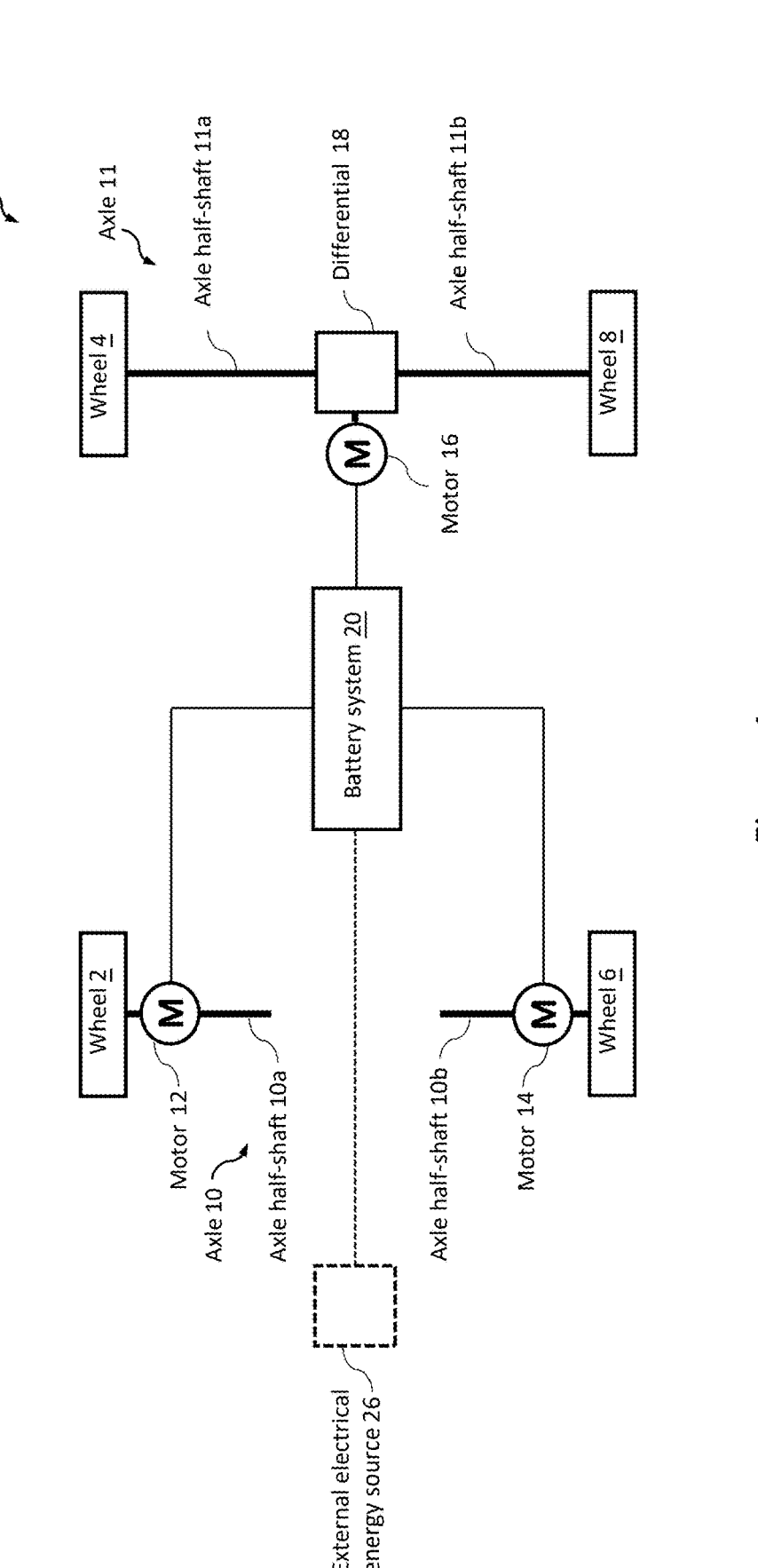
FIG. 1 shows the layout of an electric vehicle.

FIG. 1 shows the layout of an electric vehicle 1 comprising a battery system 20 to which the principles described herein can be applied. It is to be understood that the principles described herein need not be applied to an electric vehicle as shown in FIG. 1. In an example, the principles described herein can be applied to other all-wheel drive vehicles having two driven axles. For example, the principles described herein can be applied to an all-wheel drive vehicle in which both driven axles resemble axle 10, or both driven axles resemble axle 11. In another example, the principles described herein can be applied to vehicles with only one driven axle, such as rear-wheel drive vehicles or front-wheel drive vehicles. In such vehicles, the driven axle may resemble axle 10, or axle 11. In some examples, the electric vehicle may have more than two axles. For example, the electric vehicle may be a lorry. That is, an electric vehicle to which the principles described herein can be applied may have one or more electric drive motors.

It is to be understood that the principles described herein need not be applied to an electric vehicle. The principles described herein may be applied to a hybrid vehicle. A hybrid vehicle may comprise an internal combustion engine for driving one or more of the wheels, in addition to one or more electric drive motors.

Battery System Overview

Figure 2:
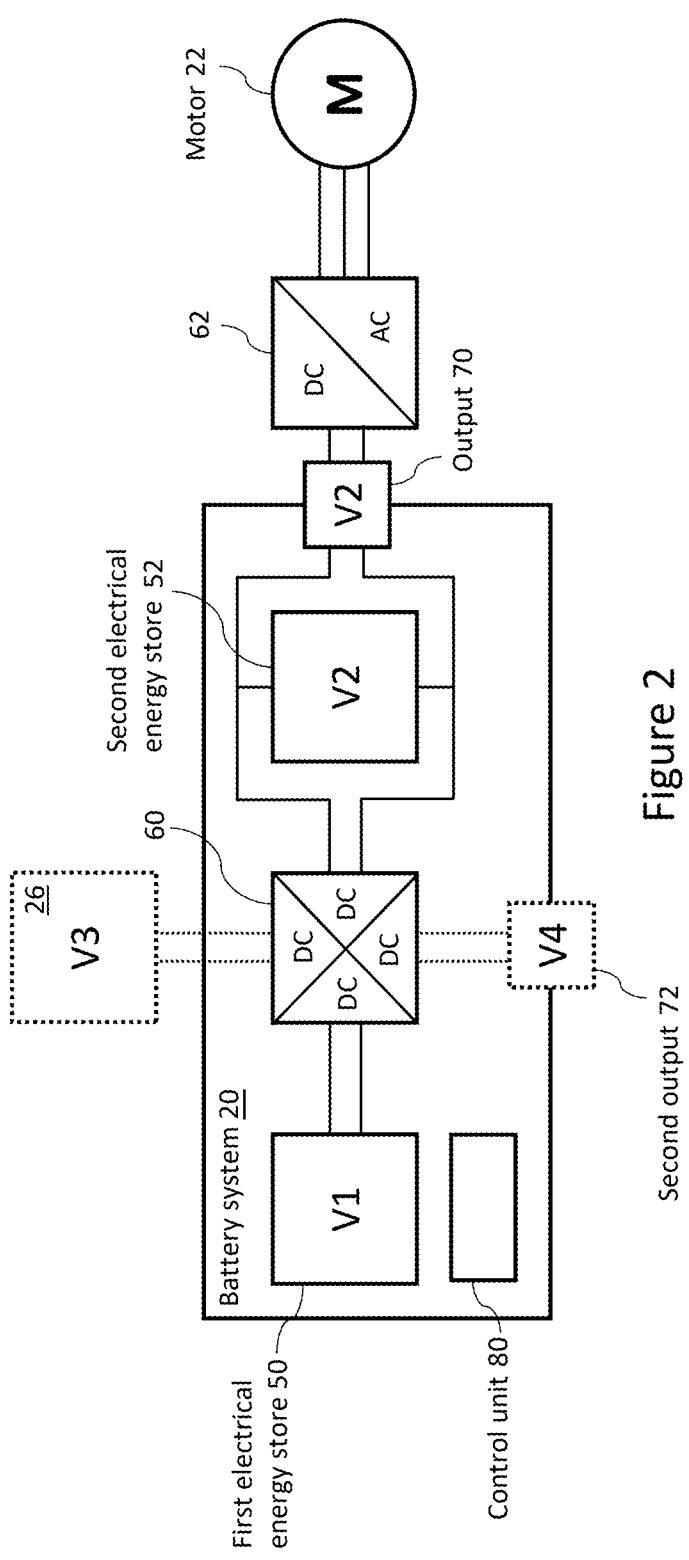
FIG. 2 shows a battery system according to the principle described herein.

FIG. 2 shows a battery system 20 according to the principle described herein. In FIG. 2, the battery system 20 has an output 70 for supplying electrical energy to an electric drive motor 22 of a vehicle. It is to be understood that, although battery system 20 in FIG. 2 is shown supplying electrical energy to one electric drive motor 22 of a vehicle, battery system 20 may supply electrical energy to more than one electric drive motor of a vehicle (e.g. each of electrical drive motors 12, 14 and 16 shown in FIG. 1).

In the example shown in FIG. 2, battery system 20 outputs electrical energy in the form of direct current (DC) via output 70. The battery system 20 is connected to a power inverter 62. The power inverter 62 converts electrical energy in the form of direct current (DC) at output 70 to alternating current (AC) for use by the electric drive motor 22. In another example, the battery system may comprise a power inverter. That power inverter may convert electrical energy in the form of direct current (DC) output by one or more electrical energy stores comprised by the battery system into electrical energy in the form of alternating current (AC) to be output by the battery system. That is, referring to FIG. 2, the output 70 may alternatively be positioned between the power inverter 62 and the electric drive motor 22 such that the power inverter 62 forms part of the battery system 20. In yet another example, the battery system may output electrical energy in the form of direct current (DC) for use by the electric drive motor 22. That is, the battery system 20 need not be connected to, or comprise, a power inverter 62.

The battery system 20 comprises a first electrical energy store 50 having a first nominal voltage V1. For example, the first nominal voltage V1 may be 400V. The battery system 20 comprises a second electrical energy store 52 having a second nominal voltage V2, the second nominal voltage V2 being greater than the first nominal voltage V1 (i.e. V1<V2). For example, the second nominal voltage may be 800V (i.e. 400V<800V).

A lithium-ion battery is an example of an electrical energy store. Examples of lithium-ion batteries include those having lithium cobalt oxide (LCO), nickel manganese cobalt oxide (NMC), lithium manganese oxide (LMO), lithium iron phosphate (LFP), or lithium cobalt aluminium oxide (NCA) battery chemistries. Further examples of suitable electrical energy stores will be provided herein.

The nominal voltage of an electrical energy store is a value that designates its voltage under specified conditions (e.g. when that electrical energy store is partially charged to 50% and operating at a specified temperature). The actual voltage at which an electrical energy store operates can vary from the nominal voltage (e.g. when the electrical energy store is depleted and/or operating at an elevated temperature) within a range that permits satisfactory operation of the battery system 20. That is, the first electrical energy store 50 is configured to provide a first electrical energy output at a first voltage V1'. The first voltage V1' may be in a first range between a first undervoltage and a first overvoltage, the first nominal voltage V1 being within the first range. The second electrical energy store 52 is configured to provide a second electrical energy output at a second voltage V2'. The second voltage V2' may be in a second range between a second undervoltage and a second overvoltage, the second nominal voltage V2 being within the second range.

The first electrical energy store 50 is connected to a voltage conversion unit 60. The voltage conversion unit 60 connects the first electrical energy store 50 and the second electrical energy store 52. The voltage conversion unit 60 is configured to convert between the first voltage V1' and the second voltage V2'. The voltage conversion unit 60 may be a direct current (DC) to direct current (DC) voltage conversion unit.

The voltage conversion unit 60 is connected to the output 70 of the battery system 20 such that the first electrical energy store 50 is connected to the output 70 of the battery system 20 via the voltage conversion unit 60. That is, the term "connected to" used herein refers to both direct, and indirect connections. The second electrical energy store 52 is also connected to the output 70 of the battery system 20. In this way, the output 70 of the battery system 20 has the second nominal voltage V2. That is, the battery system 20 is configured to provide an electrical energy output at the second voltage V2'.

This is advantageous as it is possible to configure the battery system 20 such that it adaptably utilises both of, or only one of, the first electrical energy store 50 and/or the second electrical energy store 52 in dependence on one or more of the vehicle operating conditions, vehicle duty cycle and/or the states of function of each of the first and second electrical energy stores (e.g. their respective levels of charge and/or operating temperatures).

Electric drive motor 22 may be under the control of a motor control unit (MCU) and/or a vehicle supervisory controller. For example, the MCU and/or the vehicle supervisory controller may receive control inputs from a vehicle control unit, and determine control outputs for electric drive motor 22. The vehicle control unit may provide any form of input relevant to the control of the vehicle. For example, vehicle control unit may provide user inputs, such as throttle pedal inputs.

The battery system 20 may comprise a control unit 80 configured to control the supply of electrical energy from the first electrical energy store 50 and/or the second electrical energy store 52 to output 70. For this purpose, the control unit may be in communication with, or act under the instruction of, the motor control unit (MCU) or vehicle supervisory controller for electric drive motor 22. The control unit 80 may be a microcontroller. A microcontroller may be embodied on a single metal-oxide-semiconductor integrated circuit chip. A microcontroller may comprise a microprocessor, which may include one or more CPUs capable of processing control inputs (e.g. received from an MCU) so as to generate control outputs for the first and/or second electrical energy stores 50, 52.

Specific Energy, Specific Power, and/or Discharge Rate

Electrical energy stores can also be described by their specific energy, specific power, and/or discharge rate. Specific energy (also termed "gravimetric energy density") is a measure of energy per unit mass, and may have the units Watt hours per kilogram (Wh/kg). Specific power (also termed "gravimetric power density") is a measure of the maximum available power per unit mass and may have the units Watts per kilogram (W/kg). Discharge rate is a measure of the rate at which a battery is discharged relative to its maximum capacity, and has the units of C—which is a ratio of the maximum current (in amps—A) to the capacity (in amp hours—Ah). When selecting an electrical energy store, a trade-off exists between specific energy, specific power and discharge rate.

For example, an electrical energy store with a high specific energy typically has a low specific power and a low discharge rate. By way of example, an electrical energy store may be considered to have a "high" specific energy if its specific energy is greater than 150 Wh/kg, more preferably greater than 190 Wh/kg. Solid state cells (e.g. cells comprising a solid state electrolyte) can have these properties. One example of such an electrical energy store is a solid state lithium-metal cell. For example, a lithium-metal cell may have a specific energy of approximately 400 Wh/kg and a specific power of approximately 800 W/kg. Liquid state cells (e.g. cells comprising a liquid electrolyte) with certain cell chemistries also have these properties. One example of such an electrical energy store is a lithium-ion cell having a lithium cobalt aluminium oxide (NCA) cell chemistry. For example, such a cell may have a specific energy of approximately 250 Wh/kg and a specific power of approximately 400 W/kg. It will be appreciated that numerous other specific examples of cells having these properties are commonly available. An electrical energy store may comprise one or more of these cells. Such an electrical energy store may be desirable in applications where a continuous supply electrical energy is required for an extended period of time (i.e. owing to its high specific energy and low discharge rate). For example, such an electrical energy store may be desirable if designing an electric or hybrid vehicle for maximum range (e.g. mileage per charge). However, the low specific power and low discharge rate associated with that electrical energy store would cause the acceleration of that vehicle to be relatively poor.

In another example, an electrical energy store with a high specific power typically has a low specific energy and high discharge rate. By way of example, an electrical energy store may be considered to have a high specific power if its specific power is greater than 1500 W/kg, more preferably greater than 1700 W/kg. Liquid state cells (e.g. cells comprising a liquid electrolyte) can have these properties. For example, lithium-ion cells with certain cell chemistries can have these properties. One example of such an electrical energy store is a lithium-ion cell having a lithium iron phosphate (LFP) cell chemistry. For example, such a cell may have a specific energy of approximately 80 Wh/kg and a specific power of approximately 8000 W/kg. An electrical energy store may comprise one or more of these cells. It will be appreciated that numerous other specific examples of cells having these properties are commonly available. Various commonly available supercapacitors can also have these properties. Such an electrical energy store may be desirable in applications where a high power supply of electrical energy is required for short periods of time (i.e. owing to its high specific power and high discharge rate). For example, such an electrical energy store may be desirable if designing an electric or hybrid vehicle for maximum acceleration. However, the low specific energy and high discharge rate associated with that electrical energy store would cause the range (e.g. mileage per charge) of that vehicle to be relatively poor.

For these reasons, in typical electric and hybrid vehicle applications in which the battery system comprises one type of electrical energy store, often an electrical energy store having moderate specific energy and powers and a moderate discharge rate is selected—for example, as a compromise to satisfy the requirements for both satisfactory range and acceleration.

Returning to FIG. 2, the first electrical energy store 50 and the second electrical energy store 52 may have different specific energies, specific powers, and/or discharge rates.

For example, in a first configuration, the first electrical energy store may have a higher specific energy than the second electrical energy store, the first electrical energy store may have a lower electrical energy discharge rate than the second electrical energy store, and/or the second electrical energy store may have a higher specific power than the first electrical energy store. That is, the first electrical energy store 50 may have a low specific power, a high specific energy and low discharge rate, whist the second electrical energy store 52 may have a high specific power, a low specific energy and high discharge rate.

In another example, in a second configuration, the second electrical energy store may have a higher specific energy than the first electrical energy store, the second electrical energy store may have a lower electrical energy discharge rate than the first electrical energy store, and/or the first electrical energy store may have a higher specific power than the second electrical energy store. That is, the first electrical energy store 50 may have a high specific power, a low specific energy and high discharge rate, whist the second electrical energy store 52 may have a low specific power, a high specific energy and low discharge rate.

By comprising two different electrical energy stores 50 and 52 in this way, the battery system 20 can realize the advantages of both high specific energy and high specific power electrical energy stores, without the associated downsides. For example, when a continuous supply electrical energy is desired for an extended period of time (e.g. when a vehicle is cruising at a constant speed) the battery system 20 may supply electrical energy primarily from the higher specific energy and/or lower discharge rate electrical energy store. When a high power supply of electrical energy is required for short periods of time (e.g. when a vehicle is accelerating) the battery system 20 may supply electrical energy primarily from the higher specific power and/or higher discharge rate electrical energy store. As described herein, control unit 80 may be configured to control the supply of electrical energy from the first electrical energy store 50 and/or the second electrical energy store 52 to output 70 (e.g. in response to inputs received from the motor control unit (MCU) for electric drive motor 22).

As described herein, the nominal voltage V2 of the second electrical energy store 52 is greater than the nominal voltage V1 of the first electrical energy store 50. In addition, the first electrical energy store 50 is connected to the output 70 of the battery system 20 via the voltage conversion unit 60. Voltage conversion units inevitably experience losses (e.g. by converting electrical energy into unwanted heat energy) meaning that voltage conversion is not 100% energy efficient. Thus, for example, in vehicle applications where acceleration is prioritized (e.g. vehicles primarily intended for track-racing) it may be advantageous for the second electrical energy store to be the higher specific power and/or higher discharge rate electrical energy store (e.g. the first configuration described above). In another example, in vehicle applications where range is prioritized (e.g. vehicles primarily intended for long distance road travel) it may be advantageous for the second electrical energy store to be the higher specific energy and/or lower discharge rate electrical energy store (e.g. the second configuration described above).

Voltage Conversion Unit

As described herein, the voltage conversion unit 60 is configured to convert between the first voltage V1' and the second voltage V2'.

The first electrical energy store 50 may be operable to supply electrical energy to the output 70 via the voltage conversion unit 60. That is, in use, the voltage conversion unit 60 may receive an electrical energy input from the first electrical energy store 50 at the first voltage V1'. The voltage conversion unit 60 may convert the electrical energy input at the first voltage V1' to an electrical energy output at the second voltage V2'. The voltage conversion unit 60 may provide that electrical energy output at the second voltage V2' to the output 70 of the battery system 20.

The first electrical energy store 50 may be operable to supply electrical energy to the second electrical energy store 52 via the voltage conversion unit 60 so as to charge the second electrical energy store 52. That is, the voltage conversion unit 60 may be configured to receive an electrical energy input from the first electrical energy store 50 at the first voltage V1'. The voltage conversion unit 60 may be configured to convert the electrical energy input at the first voltage V1' to an electrical energy output at the second voltage V2'. The voltage conversion unit 60 may be configured to provide that electrical energy output at the second voltage V2' to the to the second electrical energy store 52 so as to charge the second electrical energy store 52.

The second electrical energy store 52 may be operable to supply electrical energy to the first electrical energy store 50 via the voltage conversion unit 60 so as to charge the first electrical energy store 50. That is, the voltage conversion unit 60 may be configured to receive an electrical energy input from the second electrical energy store 52 at the second voltage V2'. The voltage conversion unit 60 may be configured to convert the electrical energy input at the second voltage V2' to an electrical energy output at the first voltage V1'. The voltage conversion unit 60 may be configured to provide that electrical energy output at the first voltage V1' to the to the first electrical energy store 50 so as to charge the first electrical energy store 50.

As described herein with reference to FIG. 1, battery system 20 may receive electric energy from an external electrical energy source 26 in order to charge its one or more electrical energy stores. For example, the external electrical energy source may be a mains electrical point or a vehicle charging station. The battery system 20 may be temporarily connected (e.g. "plugged into") the external electrical energy source 26 in order to charge its one or more electrical energy stores. Alternatively, the external electrical energy source 26 may be a part of the vehicle. For example, the external electrical energy source 26 could be an alternator or a kinetic energy recovery system (KERS). In this example, the battery system 20 may be permanently connected the external electrical energy source 26 in order to charge its one or more electrical energy stores. The battery system 20 may receive electric energy from more than one external electrical energy source—in some examples, simultaneously.

Returning to FIG. 2, the voltage conversion unit 60 may be further configured to receive electrical energy from an external electrical energy source 26. The external electrical energy source may have a third nominal voltage V3. For example, the third nominal voltage V3 may be 230V, 110V or 130V (e.g. where the external electrical energy source 26 is a vehicle charging point in the UK, US or Japan, respectively).

The electrical energy received at the voltage conversion unit 60 may be in the form of direct current (DC). For example, the vehicle charging point may comprise a power rectifier for converting mains electricity in the form of alternating current (AC) into electrical energy in the form of direct current (DC). Alternatively, the voltage conversion unit 60 may further comprise a power rectifier (not shown)

for converting received electrical energy in the form of alternating current (AC) into electrical energy in the form of direct current (DC).

The voltage conversion unit 60 may supply the received electrical energy to the first electrical energy store 50 and/or the second electrical energy store 52 so as to charge that respective electrical energy store. That is, the voltage conversion unit 60 may be further configured to receive an electrical energy input from the external electrical energy source 26 at a third voltage V3'. The third voltage V3' may be in a third range between a third undervoltage and a third overvoltage, the third nominal voltage V3 being within the third range. The voltage conversion unit 60 may be configured to convert the received electrical energy at the third voltage V3' to an electrical energy output at the first voltage V1'. The voltage conversion unit 60 may be configured to provide that electrical energy output at the first voltage V1' to the to the first electrical energy store 50 so as to charge the first electrical energy store 50. Alternatively, or additionally, the voltage conversion unit 60 may be configured to convert the received electrical energy at the third voltage V3' to an electrical energy output at the second voltage V2'. The voltage conversion unit 60 may be configured to provide that electrical energy output at the second voltage V2' to the to the second electrical energy store 52 so as to charge the second electrical energy store 52.

Control unit 80 may be configured to monitor the charge level of the first electrical energy store 50 and the second electrical energy store 52, and control the charging of those electrical energy stores using one or more of the charging functionalities described herein.

The battery system 20 may comprise separate voltage conversion units so as to perform each of the charging functionalities described herein (not shown in the Figures). However, it may be advantageous from a weight and/or space saving perspective to embed the charging functionalities described herein in the same voltage conversion unit 60 as is used to supply electrical energy from the first electrical energy store 50 to the output 70—as in the example shown in FIG. 2. This is because a number of the separate voltage conversion functionalities can share circuitry (e.g. inputs, outputs, transformer windings etc.) when embedded in the same voltage conversion unit 60. That is, in high-performance vehicle applications where weight and space saving is typically of the upmost importance, the relative increase in complexity caused by embedding the additional charging functionalities in the same the voltage conversion unit 60 may be preferable to the weight and size increases caused by adding one or more additional voltage conversion units to the battery system to perform those functionalities.

In addition to one or more electric drive motors, electric and hybrid vehicles typically comprise other systems that require the supply electrical energy. For example, these systems may include headlights/taillights, on-board entertainment systems, illuminated displays, central locking systems etc. In a typical electric or hybrid vehicle, a low-voltage battery (e.g. a 12V Lithium ion battery) is used to supply electrical energy to these systems, whilst a separate high-voltage battery system is used to supply electrical energy to the one or more electrical drive motors. By contrast, the battery system 20 described herein may comprise a second output 72 for supplying electrical energy to such low-voltage systems. The output 72 may have a fourth nominal voltage V4. For example, the fourth nominal voltage V4 may be 12V or 48V. This is advantageous from a weight and space saving perspective, as separate low-voltage battery need not be provided within the vehicle.

In order to achieve this, the voltage conversion unit 60 may be configured to convert from the first voltage V1' and/or second voltage V2' to a fourth voltage V4'. The fourth voltage may be in a fourth range between a fourth undervoltage and a fourth overvoltage, the fourth nominal voltage being within the fourth range. That is, the voltage conversion unit 60 may be configured to receive an electrical energy input from the first electrical energy store 50 at the first voltage V1'. The voltage conversion unit 60 may be configured to convert the electrical energy input at the first voltage V1' to an electrical energy output at the fourth voltage V4'. The voltage conversion unit 60 may be configured to provide the electrical energy output at the fourth voltage V4' to the output 72 of the battery system 20. Alternatively, or additionally, the voltage conversion unit 60 may be configured to receive an electrical energy input from the second electrical energy store 50 at the second voltage V2'. The voltage conversion unit 60 may be configured to convert the electrical energy input at the second voltage V2' to an electrical energy output at the fourth voltage V4'. The voltage conversion unit 60 may be configured to provide the electrical energy output at the fourth voltage V4' to the output 72 of the battery system 20.

Alternatively, or additionally, the voltage conversion unit 60 may be configured to convert the received electrical energy at the third voltage V3' to an electrical energy output at the fourth voltage V4'. The voltage conversion unit 60 may be configured to provide the electrical energy output at the fourth voltage V4' to the output 72 of the battery system 20. In this way, the battery system 20 can be used to supply electrical energy to the low-voltage systems of a vehicle when the battery system 20 is connected to an external electrical energy source (e.g. when the vehicle is being charged at a vehicle charging point) without depleting the charge of the first or second electrical energy stores 50 or 52.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

That which is claimed is:

1. A battery system having an output for supplying electrical energy to an electric drive motor of a vehicle, the battery system comprising:
    a first electrical energy store having a first nominal voltage and being configured to provide a first electrical energy output at a first voltage, the first electrical energy store being connected to a voltage conversion unit;
    a second electrical energy store having a second nominal voltage, the second nominal voltage being greater than the first nominal voltage, and being configured to provide a second electrical energy output at a second voltage, the second electrical energy store being connected to the output of the battery system; and the voltage conversion unit connecting the first electrical energy store and the second electrical energy store, the voltage conversion unit being connected to the output of the battery system such that the first electrical energy store is connected to the output of the battery system via the voltage conversion unit, and the voltage conversion unit being configured to:

perform a first voltage conversion functionality, in which the voltage conversion unit is configured to convert between the first voltage and the second voltage; and perform a second voltage conversion functionality, in which the voltage conversion unit is configured to:

receive an electrical energy input from an external electrical energy source at a third voltage;

convert the electrical energy input at the third voltage to an electrical energy output at the first voltage or the second voltage; and provide the electrical energy output at the first voltage to the first electrical energy store; or provide the electrical energy output at the second voltage to the second electrical energy store; and wherein the first voltage conversion functionality and the second voltage conversion functionality share circuitry of the voltage conversion unit; and wherein the first voltage is in a first range between a first undervoltage and a first overvoltage, the first nominal voltage being within the first range, and wherein the second voltage is in a second range between a second undervoltage and a second overvoltage, the second nominal voltage being within the second range.

2. The battery system of claim 1, wherein the voltage conversion unit is a direct current to direct current voltage conversion unit.

3. The battery system of claim 1, wherein the first electrical energy store is operable to supply electrical energy to the second electrical energy store via the voltage conversion unit so as to charge the second electrical energy store.

4. The battery system of claim 1, wherein the second electrical energy store is operable to supply electrical energy to the first electrical energy store via the voltage conversion unit so as to charge the first electrical energy store.

5. The battery system of claim 1, wherein the first electrical energy store and the second electrical energy store have different specific energies, different specific powers, and/or different electrical energy discharge rates.

6. The battery system of claim 5, wherein the first electrical energy store has a higher specific energy, a lower electrical energy discharge rate, and/or a lower specific power than the second electrical energy store.

7. The battery system of claim 6, wherein the first electrical energy store comprises at least one solid state electrical energy cell.

8. The battery system of claim 5, wherein the first electrical energy store has a lower specific energy, a higher electrical energy discharge rate, and/or a higher specific power than the second electrical energy store.

9. The battery system of claim 8, wherein the second electrical energy store comprises at least one solid state electrical energy cell.

10. The battery system of claim 1, the battery system further comprising a power inverter connecting the voltage conversion unit and/or the second electrical energy store to the output, the power inverter being configured to convert electrical energy in the form of direct current output by the voltage conversion unit and/or the second electrical energy store to electrical energy in the form of alternating current for outputting from the output.

11. The battery system of claim 1, wherein the first electrical energy store is operable to supply electrical energy to the output via the voltage conversion unit, and the battery system further comprising a control unit configured to control a supply of electrical energy from both of the first electrical energy store and the second electrical energy store to the output.

12. The battery system of claim 1, wherein the shared circuitry comprises:

inputs of the voltage conversion unit;

outputs of the voltage conversion unit; and/or transformer windings of the voltage conversion unit.

13. The battery system of claim 1, the voltage conversion unit being further configured to perform a fourth voltage conversion functionality, in which the voltage conversion unit is configured to:

receive the electrical energy input from the external electrical energy source at the third voltage;

convert the electrical energy input at the third voltage to an electrical energy output at a fourth voltage; and provide the electrical energy output at the fourth voltage to another output of the battery system;

wherein:

the second voltage conversion functionality and the fourth voltage conversion functionality share circuitry of the voltage conversion unit; and/or the third voltage conversion functionality and the fourth voltage conversion functionality share circuitry of the voltage conversion unit.

14. A battery system having an output for supplying electrical energy to an electric drive motor of a vehicle, the battery system comprising:

a first electrical energy store having a first nominal voltage and being configured to provide a first electrical energy output at a first voltage, the first electrical energy store being connected to a voltage conversion unit;

a second electrical energy store having a second nominal voltage, the second nominal voltage being greater than the first nominal voltage, and being configured to provide a second electrical energy output at a second voltage, the second electrical energy store being connected to the output of the battery system; and the voltage conversion unit connecting the first electrical energy store and the second electrical energy store, the voltage conversion unit being connected to the output of the battery system such that the first electrical energy store is connected to the output of the battery system via the voltage conversion unit, and the voltage conversion unit being configured to:

perform a first voltage conversion functionality, in which the voltage conversion unit is configured to convert between the first voltage and the second voltage; and perform a second voltage conversion functionality, in which the voltage conversion unit is configured to:

receive an electrical energy input from an external electrical energy source at a third voltage;

convert the electrical energy input at the third voltage to an electrical energy output at the first voltage or the second voltage; and provide the electrical energy output at the first voltage to the first electrical energy store; or provide the electrical energy output at the second voltage to the second electrical energy store;

wherein the first voltage conversion functionality and the second voltage conversion functionality share circuitry of the voltage conversion unit; and the voltage conversion unit being further configured to perform a third voltage conversion functionality, in which the voltage conversion unit is configured to convert from the first and/or second voltage to a fourth voltage.

15. The battery system of claim 14, the voltage conversion unit being configured to perform the third voltage conversion functionality, in which the voltage conversion unit is configured to:

receive, from the first electrical energy store, the first electrical energy output at the first voltage;

convert the first electrical energy output at the first voltage to an electrical energy output at the fourth voltage; and provide the electrical energy output at the fourth voltage to another output of the battery system.

16. The battery system of claim 14, the voltage conversion unit being configured to perform the third voltage conversion functionality, in which the voltage conversion unit is configured to:

receive, from the second electrical energy store, the second electrical energy output at the second voltage;

convert the second electrical energy output at the second voltage to an electrical energy output at the fourth voltage; and provide the electrical energy output at the fourth voltage to another output of the battery system.

17. The battery system of claim 14, wherein the fourth voltage is 12 volts or 48 volts.

18. The battery system of claim 14, wherein:

the first voltage conversion functionality and the third voltage conversion functionality share circuitry of the voltage conversion unit; and/or the second voltage conversion functionality and the third voltage conversion functionality share circuitry of the voltage conversion unit.

19. A vehicle comprising at least one wheel configured to be driven by an electric drive motor connected to the output of a battery system having an output for supplying electrical energy to the electric drive motor of the vehicle, the battery system comprising:

a first electrical energy store having a first nominal voltage and being configured to provide a first electrical energy output at a first voltage, the first electrical energy store being connected to a voltage conversion unit;

a second electrical energy store having a second nominal voltage, the second nominal voltage being greater than the first nominal voltage, and being configured to provide a second electrical energy output at a second voltage, the second electrical energy store being connected to the output of the battery system; and the voltage conversion unit connecting the first electrical energy store and the second electrical energy store, the voltage conversion unit being connected to the output of the battery system such that the first electrical energy store is connected to the output of the battery system via the voltage conversion unit, and the voltage conversion unit being configured to:

perform a first voltage conversion functionality, in which the voltage conversion unit is configured to convert between the first voltage and the second voltage; and perform a second voltage conversion functionality, in which the voltage conversion unit is configured to:

receive an electrical energy input from an external electrical energy source at a third voltage;

convert the electrical energy input at the third voltage to an electrical energy output at the first voltage or the second voltage; and provide the electrical energy output at the first voltage to the first electrical energy store; or provide the electrical energy output at the second voltage to the second electrical energy store; and wherein the first voltage conversion functionality and the second voltage conversion functionality share circuitry of the voltage conversion unit; and wherein the first voltage is in a first range between a first undervoltage and a first overvoltage, the first nominal voltage being within the first range, and wherein the second voltage is in a second range between a second undervoltage and a second overvoltage, the second nominal voltage being within the second range.

* * * * *